(12) United States Patent
Goossens

(10) Patent No.: US 11,243,816 B2
(45) Date of Patent: Feb. 8, 2022

(54) PROGRAM EXECUTION ON HETEROGENEOUS PLATFORM

(71) Applicants: UNIVERSITEIT GENT, Ghent (BE); IMEC VZW, Leuven (BE)

(72) Inventor: Bart Goossens, Burst (BE)

(73) Assignees: UNIVERSITEITGENT, Ghent (BE); IMEC VZW, Leuven (BE)

( * ) Notice: Subject to any disclaimer, the term of this patent is extended or adjusted under 35 U.S.C. 154(b) by 123 days.

(21) Appl. No.: 15/300,541

(22) PCT Filed: Mar. 30, 2015

(86) PCT No.: PCT/EP2015/056933
§ 371 (c)(1),
(2) Date: Sep. 29, 2016

(87) PCT Pub. No.: WO2015/150342
PCT Pub. Date: Oct. 8, 2015

(65) Prior Publication Data
US 2017/0109210 A1    Apr. 20, 2017

(30) Foreign Application Priority Data

Mar. 30, 2014    (EP) .................................. 14162520

(51) Int. Cl.
*G06F 9/46*    (2006.01)
*G06F 9/50*    (2006.01)
(Continued)

(52) U.S. Cl.
CPC .............. *G06F 9/5044* (2013.01); *G06F 8/44* (2013.01); *G06F 9/45516* (2013.01); *G06F 9/505* (2013.01)

(58) Field of Classification Search
CPC .. G06F 9/5044; G06F 9/5033; G06F 9/45516; G06F 9/3885; G06F 9/30192;
(Continued)

(56) References Cited

U.S. PATENT DOCUMENTS 7,725,885 B1 *  5/2010  Pradhan .............. G06F 9/45516
                                                          717/148
7,801,385 B2 *  9/2010  Chiu ...................... H04N 19/80
                                                          382/254

(Continued)

OTHER PUBLICATIONS

Margaret Rouse, Compiler, Jun. 2010, whatis.techtarget.com (Year: 2010).*

(Continued)

*Primary Examiner* — Emerson C Puente
*Assistant Examiner* — Zhi Chen
(74) *Attorney, Agent, or Firm* — Workman Nydegger

(57) ABSTRACT

A computer-implemented method comprises obtaining an intermediate computer code object including a set of instructions corresponding to a task to be performed. The intermediate computer code object—being machine independent—further includes for each of the at least one set of instructions one or more metadata descriptors representative of at least a complexity measure of the task to be performed. The method also comprises executing the intermediate computer code object on a computing platform comprising at least two different execution units having a different memory with a different memory location. This executing comprises selecting for each of the at least one set of instructions a target execution unit from the plurality of execution units. This selecting takes the one or more metadata descriptors and a decision rule into account, wherein the decision rule relates the plurality of complexity measures to a performance characteristic of the plurality of execution units.

17 Claims, 4 Drawing Sheets

(51) Int. Cl.
*G06F 9/455* (2018.01)
*G06F 8/41* (2018.01)

(58) Field of Classification Search
CPC ..... G06F 8/44; G06F 8/41; G06F 8/10; G06F 8/477; G06F 8/443; G06F 8/4441; G06F 8/4434; G06F 8/4432; G06F 11/3616
See application file for complete search history.

(56) References Cited

U.S. PATENT DOCUMENTS

| | | |
|---|---|---|
| 8,225,300 B1 | 7/2012 | Webb et al. |
| 8,527,973 B2 | 9/2013 | Little et al. |
| 8,538,998 B2* | 9/2013 | Barrow ............... G06F 16/8373 707/802 |
| 8,578,348 B2* | 11/2013 | Fliess ................. G06F 11/3428 717/135 |
| 8,793,673 B2* | 7/2014 | Gutz ....................... G06F 8/433 717/127 |
| 2004/0030448 A1* | 2/2004 | Solomon ............... G05D 1/0088 700/245 |
| 2006/0026116 A1* | 2/2006 | Day .................. G06F 16/24547 |
| 2007/0174101 A1* | 7/2007 | Li ......................... G06Q 10/063 705/7.26 |
| 2008/0018543 A1* | 1/2008 | Baliarda .............. H01Q 9/0407 343/702 |
| 2008/0082805 A1* | 4/2008 | Wakabayashi ........ G06F 17/505 712/236 |
| 2008/0276262 A1 | 11/2008 | Munshi et al. |
| 2009/0144698 A1* | 6/2009 | Fanning .................... G06F 8/75 717/120 |
| 2010/0223204 A1* | 9/2010 | Zborovskiy ............ G06Q 40/00 705/36 R |
| 2011/0063306 A1* | 3/2011 | Diard ..................... G06F 9/455 345/503 |
| 2012/0311157 A1* | 12/2012 | Erickson ................ G06F 9/541 709/226 |
| 2012/0317556 A1 | 12/2012 | Zhu et al. |
| 2013/0050229 A1 | 2/2013 | Song et al. |
| 2013/0128307 A1* | 5/2013 | Utsunomiya ......... G06F 9/5027 358/1.15 |
| 2013/0160016 A1 | 6/2013 | Gummaraju et al. |
| 2014/0176586 A1* | 6/2014 | Gruber ................ G06F 12/0607 345/533 |
| 2014/0244333 A1* | 8/2014 | Bournas ......... G06Q 10/063116 705/7.16 |
| 2016/0012352 A1* | 1/2016 | Peng ...................... G06N 20/00 706/12 |
| 2016/0020782 A1* | 1/2016 | Ruff ........................ H03M 7/30 341/95 |

OTHER PUBLICATIONS

Extended European Search Report for corresponding European Application No. 14162520.2, dated Aug. 14, 2014.
International Search Report for corresponding International PCT Application No. PCT/EP2015/056933, dated Jun. 5, 2015.
European Office Action from EP Application No. 15713472.7, dated Sep. 12, 2017.

* cited by examiner

```
% Inputs: kernel, args, dims, blkdims
% Outputs: target
% Thresholds: T_C, T_dims, T_Delta1, T_Delta2, T_Occupancy
% Parameters used: 1, 3, 4, 5, 9, 9

% We are likely to execute on the CPU
% Check if there is sufficient memory to copy all of the arguments
% to the GPU.
if (gpu_memory_manager.sufficient_space(args))
    target = TARGET_CPU;
elseif (Complexity_level < T_C && prod(dims) < T_dims)
    % Light-weight kernel function; it is likely more efficient to execute on the CPU
    % => Calculate the memory transfer time from CPU -> GPU
    Delta = Mem_transfer_bytes(args, CPU->GPU) * Avg_transfer_rate(CPU->GPU) - ...
            Mem_transfer_bytes(args, GPU->CPU) * Avg_transfer_rate(CPU->GPU)

if Delta < T_Delta1
        target = TARGET_CPU;    % Execute on the CPU
    endif
else
    % Calculate the occupancy; if the occupancy is too low, we may consider
    % execution on the CPU
    occupancy = calcOccupancy(kernel, dims, blkdims)
    if occupancy < T_occupancy
        % => Calculate the memory transfer time from CPU -> GPU
        Delta = Mem_transfer_bytes(args, CPU->GPU) * Avg_transfer_rate(CPU->GPU) - ...
                Mem_transfer_bytes(args, GPU->CPU) * Avg_transfer_rate(CPU->GPU)

if Delta < T_Delta2
            target = TARGET_CPU;
        else
            target = TARGET_CPU;    % Execute on the CPU
        endif
    endif
endif
```

FIG. 5

```
% Inputs: kernel, args, dims, blkdims, cmdqueue(CPU), cmdqueue(GPU)
% Outputs: target
% Thresholds: T_C, T_dims, T_Occupancy, T_size, T_Delta, T_code
% Parameters used: 1, 2, 3, 4, 5, 6, 8, 9, 10 if Complexity_level < T_C && code_len < T_code && prod(dims) < T_dims
    % Light weight kernel function; it is likely more efficient to execute on the CPU
    target = TARGET_CPU
else
    % Calculate the occupancy; if the occupancy is too low, we may consider
    % execution on the CPU
    occupancy = calcOccupancy(kernel, dims, blkdims)
    if occupancy < T_occupancy
        target = TARGET_CPU
    endif if size(cmdqueue(CPU)) - size(cmdqueue(GPU)) < T_size
        target = TARGET_CPU
    else
        % => Calculate the memory transfer time from CPU --> GPU
        Delta = Mem_transfer_bytes(args, CPU->GPU) * Avg_transfer_rate(CPU->GPU) -
                Mem_transfer_bytes(args, GPU->CPU) * Avg_transfer_rate(GPU->CPU)
        if Delta > T_Delta
            target = TARGET_CPU
        else
            target = TARGET_GPU
        endif
    endif
endif
```

FIG. 6

PROGRAM EXECUTION ON HETEROGENEOUS PLATFORM

FIELD OF THE INVENTION

The invention relates to the field of computer program execution on computing platforms with at least two different execution units having a memory with different memory location, such as for example a CPU and a GPU. More specifically it relates to a computer-implemented method for executing a sequence of instructions, e.g. a computer program, on such a computing platform and computer program products related to such computer-implemented method.

BACKGROUND OF THE INVENTION

Heterogeneous computing platforms nowadays comprise a plurality of execution units having mutually distinct processing properties, such as different low-level instruction sets, e.g. different machine language instruction encodings, different memory organization schemes, different processing capabilities and/or different performance characteristics depending on the low-level instructions and/or high-level tasks executed. For example, a heterogeneous computing platform may comprise at least one central processing unit (CPU) core which may be particularly suitable for performing a wide variety of complex computing tasks and for high-speed serial execution of instructions, e.g. instructions formatted in an x86 instruction set family machine language. The plurality of execution units may also comprise at least one graphics processing unit (GPU) core, which may be particularly suitable for performing a large number of relatively simple operations in parallel. The plurality of execution units may also comprise a coprocessor for supplementing the functions of a primary CPU, e.g. a coprocessor specifically adapted for fast signal processing, encryption or input/output (I/O) interfacing. The plurality of execution units may also comprise a field-programmable gate array (FPGA) adapted for run-time hardware reconfiguration, e.g. using a hardware description language (HDL). Although the heterogeneous computing platform may be integrated into a single computing system, e.g. a personal computer comprising a CPU, e.g. a multi-core CPU, and at least one GPU, the heterogeneous computing platform may also comprise a distributed computing system, e.g. comprising a plurality of computers having identical or distinct configurations, for example each comprising a CPU and a GPU, the CPUs and GPUs not necessarily identical or compatible over the plurality of computers.

A number of methods for handling programming and program execution on a heterogeneous computing platform have been described in literature.

U.S. Pat. No. 8,225,300 discloses a method which comprises receiving a program that includes one of a parallel construct or a distributed construct, creating a target component from the program, and integrating the target component into a target environment to produce a client program that is executable on multiple heterogeneous server platforms including a non-homogeneous set of Turing-complete computing resources capable of communicating with one another. One or more tasks are automatically distributed across the heterogeneous server platforms based on a request for task processing. A client environment may provide resource and/or task processing requests to a scheduler/job manager. The scheduler/job manager may determine an allocation strategy for resource/task processing requests based on available hardware resources and resource/task processing requests. For example, the scheduler/job manager may determine a subset of available execution units which are capable of executing a resource/task processing request, and may arbitrarily assign a unit from this set to the request. However, it is a disadvantage of this method that although an available execution unit is automatically assigned to handle a request which has the required capabilities, the disclosed method may select, e.g. randomly select, an execution unit which has a poor performance for executing the task at hand.

U.S. Pat. No. 8,527,973 also discloses a method which comprises receiving a program created by a technical computing environment, analyzing the program, generating multiple program portions based on the analysis of the program, dynamically allocating the multiple program portions to multiple software units of execution for parallel programming, receiving multiple results associated with the multiple program portions from the multiple software units of execution, and providing the multiple results or a single result to the program.

SUMMARY OF THE INVENTION

It is an object of embodiments of the present invention to provide good means and methods for executing a computer program on a heterogeneous computing platform.

The above objective is accomplished by a method and device according to the present invention.

The present invention relates to a computer-implemented method comprising obtaining an intermediate computer code object comprising at least one set of instructions corresponding to a task to be performed, the intermediate computer code object further comprising for each of said at least one set of instructions one or more of metadata descriptors representative of at least a complexity measure of said task to be performed, the intermediate computer code object being machine independent, and executing at run-time said intermediate computer code object on a computing platform comprising at least two different execution units having a memory with a different memory location, said executing at run-time comprising selecting (6) for each of said at least one set of instructions a target execution unit from said plurality of execution units, said selecting taking into account the one or more of metadata descriptors and a decision rule relating said plurality of complexity measures to a performance characteristic of the plurality of execution units.

It is an advantage of embodiments of the present invention that metadata descriptors are generated at compiler level and inherently enclosed in the intermediated computer code object and that these metadata descriptors are used for influencing run-time decisions. It is an advantage of embodiments of the present invention that both compile-time parameters (metadata descriptors) extracted from the high-level programming language used and run-time parameters available at run-time are combined for selecting the most suitable device for executing the intermediate computer code object. It is an advantage of embodiments of the present invention that an efficient method and system is obtained as the required metadata descriptors information for executing is inherently present in the intermediate computer code object and is automatically supplied for executing.

The at least two different execution units may be a central processing unit (CPU) and a graphical processing unit (GPU).

The corresponding plurality of complexity measures may be obtained by at least analyzing the intermediate code.

The one or more metadata descriptors may be representative of a corresponding plurality of complexity measures of said task to be performed.

The at least two different execution units may be graphical processing units (GPUs) having a memory with a different memory location.

The intermediate computer code object may be obtained in an execution unit independent intermediate format. It is an advantage of embodiments of the present invention that the method allows programming such that efficient executing in a computing platform can be automatically performed.

Executing the intermediate computer code object may comprise determining whether a first set of said at least one set of instructions and a second set of said at least one set of instructions can be executed concurrently.

Executing the intermediate computer code object may comprise providing automated memory allocation to provide data for being processed by the execution of each of said at least one set of instructions to the corresponding target execution unit. Automated memory allocation thereby may refer to the fact that no user intervention is required for memory allocation, i.e. that memory allocation occurs automatically by the system.

Executing the intermediate computer code object may comprise translating each of the at least one set of instructions to a machine level format executable by the corresponding target execution unit.

Obtaining the intermediate computer code object may comprise compiling the intermediate computer code object from a computer program code specified in accordance to a high-level programming language specification.

It is to be noticed that the compilation of the intermediate computer code into machine dependent code may be performed at runtime, but that this nevertheless is not required. In other words, the compilation of the intermediate computer code into machine-dependent code may occur not solely at run-time.

Obtaining the intermediate computer code object further may comprise for each of said at least one set of instructions determining the one or more of metadata descriptors representative of the corresponding plurality of complexity measures.

The one or more metadata descriptors may be one or more parameters determinable at compiler level and expressing a complexity of a kernel function of the intermediate computer code object.

The selecting also may take into account one or more of a code length, a product of data dimensions, a product of GPU block dimensions, a total number of GPU blocks, a number of assigned CPU threads, a memory transfer time, a GPU occupancy, a size or load of CPU and GPU command queues or an overall load of CPU and GPU queues.

The present invention also relates to a first computer program product for executing an intermediate computer code object, the first computer program product comprising an input component for obtaining an intermediate computer code object comprising at least one set of instructions corresponding to a task to be performed, the intermediate computer code object further comprising for each of said at least one set of instructions one or more of metadata descriptors representative of a corresponding plurality of complexity measures of said task to be performed, and a run-time component for executing said intermediate computer code object on a computing platform comprising at least two different execution units having a memory with a different memory location, wherein the run-time component comprises a selection unit for selecting for each of said at least one set of instructions a target execution unit from said at least two execution units, said selecting taking into account the one or more of metadata descriptors and a decision rule relating said plurality of complexity measures to a performance characteristic of the at least two different execution units.

The run-time component furthermore may comprise a memory manager unit for automated memory allocation.

The run-time component furthermore may comprise a run-time scheduler unit adapted for determining whether a first set of said at least one set of instructions and a second set of said at least one set of instructions can be executed concurrently.

The first computer program product, may be implemented by a set of instructions for executing an intermediate computer code object.

The present invention also relates to a second computer program product for generating an intermediate computer code object, the second computer program product comprising:

an input component for obtaining a computer program code specified in accordance to a high-level programming language specification, a compiler component for compiling the computer program code into an intermediate computer code object comprising at least one set of instructions corresponding to a task to be performed, and an analysis component for annotating each of said at least one set of instructions with one or more of metadata descriptors representative of a corresponding plurality of complexity measures of said task to be performed.

The analysis component may be adapted for determining the one or more metadata descriptors representative of at least a measure related to conditional branches, backward jumps, dynamic memory allocation, indirect function calls and/or thread synchronization.

The second computer program product may be implemented as a software compiler.

The present invention also relates to a data carrier comprising a set of instructions for, when executed on a computer, executing intermediate computer code object on a computing platform comprising at least two different execution units having a memory with different memory location according to a method as described above.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 5 and FIG. 6 illustrate screen shots of implementations of decisions rules, as can be used in exemplary embodiments of the present invention.

Figure 1:
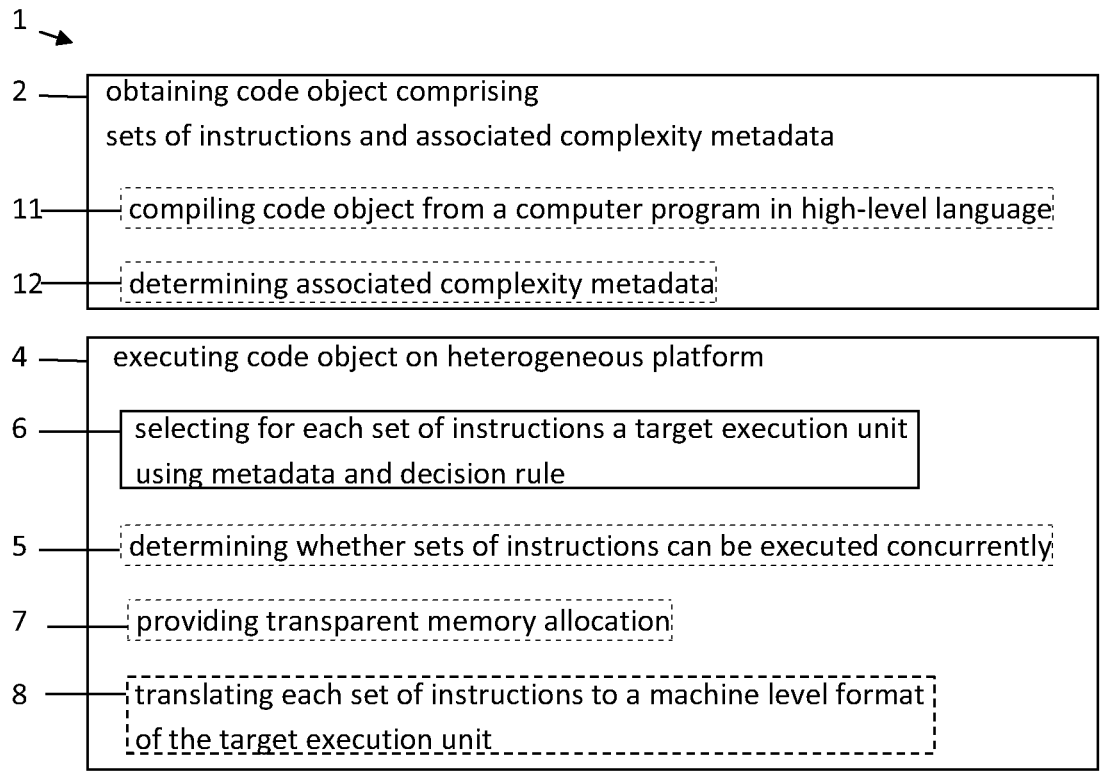
FIG. 1 illustrates an exemplary method according to embodiments of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to "run-time", reference is made to the moment in time when the program is running on the computer, in contrast to compile time.

Where in embodiments of the present invention reference is made to execution, reference is made to execution at run-time, unless otherwise indicated.

Where in embodiments of the present invention reference is made to execution units having a memory with a different memory location, reference can be made to a CPU and GPU, a GPU and another type of processing unit, or two GPUs e.g. part of a GPU network having different memories with a different memory location.

In a first aspect, the present invention relates to a computer-implemented method. This method comprises obtaining an intermediate computer code object comprising at least one set of instructions corresponding to a task to be performed, and for each of said at least one set of instructions a plurality of metadata descriptors representative of a corresponding plurality of complexity measures of said task to be performed. The method further comprises executing the intermediate computer code object on computing platform comprising at least two execution units with a memory having a different memory location (i.e. the memory locations for the different execution units are different). Such systems may comprise a plurality of execution units wherein there is at least one graphical processing unit GPU and at least one processing unit of a different type, e.g. a central processing unit CPU. The latter typically may be referred to as heterogeneous computing platforms. Alternatively, systems are also encompassed comprising at least two different GPUs, for example a GPU network wherein optionally no CPUs are present, whereby the GPUs are execution units with different memory locations. This step of executing the intermediate computer code object comprises selecting for each of said at least one set of instructions a target execution unit from the plurality of execution units. This selecting furthermore takes the plurality of metadata descriptors and a decision rule into account. The decision rule relates the plurality of complexity measures to a performance characteristic of the plurality of execution units.

Further details and advantages of standard and optional steps of a computer-implemented method according to at least some embodiments of the present invention will now further be described with reference to an exemplary computer-implemented method and to the drawings, embodiments of the present invention not being limited thereto.

Referring to FIG. 1, an exemplary computer-implemented method 1 according to embodiments of the present invention is shown. This method may be a method for executing high-level operations, e.g. high-level parallel operations, on computing platforms having at least two execution units with a memory having a different memory location, e.g. on heterogeneous computing devices. Such heterogeneous computing platform may comprise a plurality of execution units, e.g. a plurality of execution units wherein at least some are functionally and/or structurally distinct execution units, such as, for example, a central processing unit (CPU) core and a graphics processor unit (GPU). However, the computing platform also may comprise a plurality of graphical processing units, e.g. connected via a network, wherein at least two graphical processing units have a memory with a different memory location, e.g. a distributed computing system. The computing platform may also comprise for example a coprocessor particularly suitable to perform a specific task, e.g. floating point arithmetic operations or signal processing. The heterogeneous computing platform may also comprise for example a field-programmable gate array (FPGA).

According to embodiments of the present invention, the heterogeneous computing platform may consist of a single computer comprising at least two cores or may consist of a set of computers wherein the set comprises at least two computing devices. The single computer or the set of computers may comprise one or more CPUs and/or GPU's having different properties, such as for example GPU1 and GPU2 wherein both GPUs have different properties. The different CPUs and/or GPUs may thus be cores in different computing devices or in the same computer device. The computing device can either be a single core or a multi core CPU.

The method 1 comprises a step of obtaining 2 an intermediate computer code object. The intermediate computer code object may be obtained in an execution unit independent intermediate format. The intermediate computer code object may encode a computer program, e.g. an algorithm for performing an automated task on a computing platform. The method 1 may be particularly suitable for executing an iterative algorithm involving complex, parallelizable operations, e.g. the intermediate computer code object may encode such iterative parallelizable algorithm, for example a signal processing algorithm, a 2D image processing algorithm or a 3D image processing algorithm. The intermediate computer code object may comprise an intermediate representation, for example, a register transfer language, a static single assignment form, a reverse Polish notation (RPN) representation of platform-independent opcodes and references, e.g. references to data structures, functions and procedures.

This intermediate computer code object, also referred to as intermediate representation, comprises at least one set of instructions corresponding to a task to be performed. The at least one set of instructions, e.g. at least one sequence of instructions, may comprise high-level operations, e.g. may comprising an instruction for performing a high-level operation such as a matrix operation, an image manipulation operation or a Fourier transform. For example, an instruction in the intermediate computer code object may instruct the execution of a multiplication of real-valued or complex-valued matrices or apply a goniometric transformation to each element of a vector.

For each of the at least one set of instructions, e.g. instructions defining a kernel function corresponding to a task to be performed, e.g. an algorithm for an element-wise matrix operation, the intermediate computer code object also comprises a plurality of metadata descriptors representative of a corresponding plurality of complexity measures of said task to be performed.

The complexity measures may be obtained based on the intermediate computer code.

The intermediate code is such that the code is machine or device independent.

The intermediate computer code object may be an execution unit independent intermediate format, e.g. may be executed on a plurality of structurally and functionally different computing devices. For example, the at least one set of instructions corresponding to a task to be performed may comprise instructions which are specified in a machine-level agnostic manner. Such instructions may thus be executed by a computer-implemented interpreter which translates each instruction in a suitable computer code suitable for execution on a specific execution unit. The decision on which computing device the intermediate program code object is executed thus typically is made at run-time. Furthermore, the plurality of metadata descriptors may also be specified in a machine-level agnostic manner, e.g. the descriptors may be representative of a corresponding plurality of complexity measures of the task to be performed independent on performance characteristics and capabilities of an execution unit on which the corresponding task is executed.

For example, the plurality of metadata descriptors may comprise a set of values of corresponding complexity measures determined for the set of instructions to which it is attributed. Such metadata descriptors may comprise indicator variables, integer variables, real-valued variables or even structured variables, e.g. a pointer to a node in an hierarchical classification tree. The complexity measures may comprise measures which are mutually independent or provide at least partially complementary information, relating to different aspects of computational complexity of the set of instructions. The complexity of a kernel function is defined based on a number of parameters. The idea is that a kernel function using for example loops or thread synchronization typically needs a longer completion time than kernel functions that only consist of a small number of calculations with no loop. For example, complexity measures may thus comprise information regarding loop structures, nested loop depth, conditional code execution, branching, branching depth, dynamic memory allocation, backward jumps in the code during execution, indirect function calls or synchronization requirements such as inter-thread synchronization. In particular embodiments, at compiler level, the complexity may be determined and may be assigned a score, e.g. between 0 and 10. In one example this may for example be based on the following parameters:

(a) COMPLEXITY_BRANCHES (1): The kernel function contains if statements
(b) COMPLEXITY_TEN_STATEMENTS (2): The kernel function has at least 10 statements (c) COMPLEXITY_DYNAMIC_MEMORY (3): The kernel function requires dynamic memory allocation
(d) COMPLEXITY_JUMP_BACK (8): The kernel function contains a backward jump (typically a loop)
(e) COMPLEXITY_INDIRECT_CALLS (9): The kernel function performs indirect calls (e.g. through function pointers)
(f) COMPLEXITY_SYNCHRONIZATION (10): The kernel function requires thread synchronization As will be clear, this is only an example and different selections may be made.

It is an advantage of embodiments of the present invention that the intermediate computer code object can be executed on a platform comprising execution unit types not considered when compiling the intermediate computer code object, e.g. a novel CPU or GPU architecture. The decision is thus taken at run-time. This execution can furthermore be performed efficiently by simply adapting the run-time interpreter to this type of execution unit and providing a suitable decision rule. The decision rule or rules will allow or assist in selecting which execution unit will be used. This adaptation can furthermore be advantageously performed independent of the computer program to be executed.

The method further comprises executing 4 the intermediate computer code object on a computing platform comprising at least two execution units with a memory having a different memory location. This step of executing the intermediate computer code object comprises selecting 6 for each of said at least one set of instructions a target execution unit from the plurality of execution units. This selecting furthermore takes the plurality of metadata descriptors and a decision rule into account. The decision rule relates the plurality of complexity measures to a performance characteristic of the plurality of execution units. For example, the decision rule may be adapted for predicting which of the plurality of execution units will perform best at performing the task encoded by the set of instructions, e.g. which execution unit has the highest probability of providing the best performance for the task at hand. The decision rule may for example be a classifier expression, e.g. providing a partitioning of the space spanned by the plurality of complexity measures into regions of dominant performance for subsets, e.g. elements, of the plurality of execution units. Such decision rule may for example be obtained by profiling a set of reference tasks, e.g. for which the points in the space defined by the complexity measures provide a good sampling of this space, and determining for each reference task the best performing execution unit. It is an advantage of embodiments of the present invention that good performance in executing a program can be obtained without requiring detailed profiling of this program, e.g. manually or automatically executing components of the program, e.g. different sets of instructions encoding constituent tasks, on a plurality of execution units in order to determine the best performing solution.

However, the selecting may also take a runtime parameter into account, for example, the dimensionality or number of elements of a data structure on which the at least one set of instructions, e.g. a kernel function, operates. Thus, the decision rule may for example be a classifier expression, e.g. providing a partitioning of the joint space spanned by the plurality of complexity measures and the at least one runtime parameter into regions of dominant performance for subsets, e.g. elements, of the plurality of execution units. The at least one runtime parameter may for example comprise a dimensionality, number of elements and/or data type of a data structure provided as input parameter to the at least one set of instructions, e.g. to a kernel function. The at least one runtime parameter may comprise a number of threads or parallel units assigned to an invocation of the at least one set of instructions, e.g. taking memory requirements into account. In some embodiments of the present invention, the decision rule may for example take into account, besides a complexity, one or more or all of the following parameters:

Code length: describes the number of (medium-level) "instructions" that the kernel function contains. Code length is defined in an architecture-independent manner. Note that the "code length" is often used as a heuristic for function inlining in modern compilers.

Product of the data dimensions: a kernel function is applied to every element of a data set (e.g. every pixel of an image). The total number of data items is therefore an important indicator for the computation time of the kernel function.

Product of the GPU block dimensions: when a GPU executes a kernel function, the data is divided into blocks and each block is processed sequentially (or often mixed sequentially/parallel by different multi-processors). The block size is the result of a different optimization procedure. This can be a numerical procedure, an analytical procedure, can be based on profiling, etc. The present invention thus is not limited by the specific optimization procedure(s) used.

The total number of GPU blocks: this is obtained by the data dimensions dim, corresponding with the data dimension, divided by the block dimensions blk dim, corresponding with the dimension of the blocks i.e. with the block size, and by calculating the product of the result:

$$n = \left\lceil \frac{dim_1}{blk\ dim_1} \right\rceil \cdots \left\lceil \frac{dim_D}{blk\ dim_D} \right\rceil$$

where D is the dimensionality of the data.

Number of assigned CPU threads: due to the threading granularity of the OS, for light-weight tasks it is often more efficient to run the kernel function on one CPU core rather than on all available cores. The selection of the number of CPU threads is typically binary (1 core or all available cores) and is performed by a separate decision rule. The number of CPU threads may also be selected dynamically (e.g. based on current load of the CPU). Therefore, the number of assigned CPU threads may also be an indicator for whether the CPU is a good choice for execution.

Memory transfer time: due to the distributed memory system, it may be necessary to perform data transfers from CPU to GPU in order to run the specified kernel function on the GPU, or from GPU to CPU in order to run on the CPU. Because the run-time system knows exactly how many bytes of memory that need to be transferred, the memory transfer time can be estimated, by multiplying the number of bytes by an average device-dependent transfer rate (adding a small constant that contains the driver-level overhead).

GPU occupancy: defined as the maximum number of active warps on a GPU divided by the maximal number of supported warps, it is an indicator of the GPU utilization. For example, when it is known in advance that the GPU occupancy is fairly low, it may be more efficient to run the kernel function on the CPU. Note that the definition of GPU occupancy still ignores two aspects:
(a) The execution of different asynchronous kernel functions on the GPU (it only considers one kernel function).
(b) Instruction level parallelism: in some (rare) cases the occupancy can be low but the throughput can be high.

Nevertheless, because the GPU utilization is difficult to predict directly, the GPU occupancy is still a useful parameter.

Detection of instruction level parallelism is much harder because it requires device-specific analytical modeling tools (which we will not consider here). The GPU occupancy can be calculated in the same way as in the NVidia Occupancy Calculator Excel spreadsheet (which has later been integrated in the NVidia nSight Profiler and NVidia Visual Profiler programs).

Size or load of the CPU and GPU command queues. Due to the fact that the performance ratio is sufficiently high, it is usually still most efficient to schedule a kernel function on the GPU command queue even when this queue is full. Moreover, when the decision would be to run the kernel function on the CPU, still some memory transfers would be needed. These memory transfers then would need to be scheduled to the GPU command queue anyway. For Fermi devices, the parallel handling of memory transfers and kernel functions is rather limited (i.e. usually they are performed sequentially or with only partial overlap). As such, assuming that at least one memory transfer is necessary, it makes little sense to run a kernel function on the CPU even when the GPU is busy. Nevertheless, as GPUs will advance in the future, the effect of the parameter may become more relevant.

Overall load of the CPU and GPU command queues: Rather than counting the number of kernel functions waiting to be processed by the CPU or GPU, one can also take their kernel complexity into account in this metric. This gives a more accurate prediction when heterogeneous kernel functions are used.

Therefore, in embodiments according to the present invention, a good performance of execution of a block of code may be achieved without requiring an extensive profiling operation of the block of code on a plurality of possible execution units, e.g. a CPU and a GPU, but may also provide a good performance tuned to the size, type and/or dimensionality of input data determined during execution. For example, a code fragment, e.g. a kernel function, may be preferably executed on the CPU of a computer when the input data is relatively small, e.g. due to an overhead of scheduling the execution on a GPU, translating the instructions to a GPU compatible format and/or memory transfer to a dedicated graphics memory. When the same code fragment would be invoked with a larger input data structure, execution could be preferred on the GPU, as the parallel processing capabilities in executing the task would outweigh the overhead cost. However, a different task could be more complex, and would benefit from selection of a GPU device instead of a CPU device at a smaller input data structure size threshold. It is furthermore to be noted that the complexity of two tasks can be substantially different in more than one manner, e.g. a first task could involve many branching conditions, while a second task could involve many nested loops, such that a multidimensional representation of the parameters influencing the inherent complexity of a task may provide good means for determining a suitable execution unit without requiring a priori knowledge, during preparation of the intermediate computer code object, regarding the specific combination of execution units on a computing platform on which the code is to be executed and performance tradeoffs associated with this combination.

Executing 4 the intermediate computer code object may also comprise determining 5 whether a first set of said at least one set of instructions and a second set of said at least one set of instructions can be executed concurrently, e.g. taking into account data dependencies and the corresponding targeted execution units. Thus, executing 4 the intermediate computer code object may comprise runtime scheduling in order to define the order in which the sets of the at least one set of instructions are to be executed on each of the corresponding target execution units.

Executing 4 the intermediate computer code object may further comprise providing 7 automated memory allocation, e.g. memory sharing, memory mirroring and/or dirty tagging of memory copies, to provide data being processed by the execution of each of said at least one set of instructions to the corresponding target execution unit. For example, a first set of instructions from the at least one set of instructions may have a first execution unit selected as target execution unit, while a second set of instructions from the at least one set of instructions may have a second execution unit selected which differs from the first execution unit. Executing the intermediate computer code object may thus take data dependencies into account between the first set of instructions and the second set of instructions in order to automatically copy data between memory available to the first execution unit and the second execution unit. Providing 7 automated memory allocation may comprise tracking the most recently changed copy of data in memories available to different execution units, in order to synchronize such copies when required during execution. This automated memory allocation may further comprise automated data conversion between machine-level specific data formats, e.g. in order to account for differences in architecture of the execution units. For example, such automated data conversion may comprise simple operations such as changing a most significant bit first (MSB) representation to a least significant bit first (LSB) representation, or more complex operations, such as changing the order in which matrix dimensions are internally stored in order to make advantageous processing features of a specific execution unit available, or changing a floating point format which is not supported by a specific execution unit to a lower precision format which is supported, or into an aggregate of such lower precision formats to avoid loss of information due to rounding errors.

Executing 4 the intermediate computer code object may further comprise translating 8 each of the at least one set of instructions to a machine level format executable by the corresponding target execution unit, e.g. the target execution unit selected for the set of instructions. For example, this translating may comprise a just-in-time compilation of the set of instructions into a suitable machine level format, running an interpreter program in the suitable machine level format for interpreting the set of instructions, a combination thereof, or an alternative of translating a non-native set of instructions into a native machine level format as known in the art.

In a method according to embodiments of the present invention, obtaining 2 the intermediate computer code object may comprise compiling 11 the intermediate computer code object from a computer program code specified in accordance to a high-level programming language specification, e.g. a programming language which provides a strong abstraction from the details of program execution by an execution unit, e.g. a processor. Such high-level programming language may for example use natural language elements, may be adapted for ease of use, may automate, and preferably hide entirely, significant areas of low-level computing system programming such as memory management and processor register operations, and may provide a human-readable and easily understandable code.

Obtaining 2 the intermediate computer code object may further comprise, for each of the at least one set of instructions, determining 12 the plurality of metadata descriptors representative of the corresponding plurality of complexity measures. For example, a compiler program or a support program for a compiler may analyse the high-level computer program code, determine sets of instructions corresponding to the execution of specific tasks, e.g. highly parallelizable tasks, and derive a plurality of complexity measures related to each set of instructions.

Figure 2:
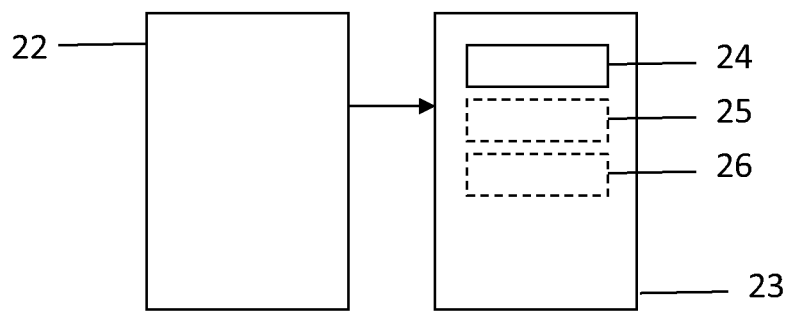
FIG. 2 illustrates a first computer program product according to embodiments of the present invention.

In a second aspect, the present invention also relates to a first computer program product. FIG. 2 schematically illustrates an exemplary first computer program product 21 according to embodiments of the present invention.

The first computer program product 21 is adapted for executing an intermediate computer code object, e.g. may be an interpreter or run-time stub for executing the intermediate computer code object.

The first computer program product comprises an input component 22 for obtaining an intermediate computer code object comprising at least one set of instructions, e.g. at least one sequence of instructions or at least code fragment construct comprising instructions, corresponding to a task to be performed. This input component 22 may for example retrieve the intermediate computer code object from a file on disk or a from a preloaded memory region. The input component 22 may be adapted for providing a command queue of instructions encoded in the intermediate computer code object. In some embodiments, the intermediate computer code object may be incorporated in the first computer program product, e.g. may be packaged into a single executable file. In other embodiments, the intermediate computer code object may for example be provided in a separate file being loaded by the first computer program product. The intermediate computer code object further comprises for each of the at least one set of instructions a plurality of metadata descriptors representative of a corresponding plurality of complexity measures of the task to be performed. Thus, the intermediate computer code object may comprise a high-level computer-readable program code having blocks defined therein which are annotated by corresponding complexity metadata. It is to be noted that this complexity metadata may be highly machine-independent, e.g. may characterize aspects related to complexity of a task to be executed without taking machine-specific performance characteristics into account. The complexity metadata may be similar as described above. In one particular example, the complexity metadata may for example relate to:

- the number of instructions required to perform the task,
- the presence, number and/or nesting depth of execution loops required,
- the presence, number and/or nesting depth of conditional branches required,
- the presence, number or depth of recursive statements,
- the use of dynamic memory allocation,
- the static and/or dynamic memory storage space requirements, and/or
- the use of indirect function references, object inheritance, dynamic object dispatching, abstract data types, object encapsulation and/or open recursion.

The first computer program product also comprises a run-time component 23 for executing the intermediate computer code object on a computing platform comprising at least two execution units having a memory with a different memory location. This run-time component 23 comprises a selection unit 24 for selecting for each of the at least one set of instructions a target execution unit from the plurality of execution units. This selecting furthermore takes the plurality of metadata descriptors and a decision rule into account, in which the decision rule relates the plurality of complexity measures to a performance characteristic of the plurality of execution units. Therefore, the first computer program product may be adapted for a specific heterogeneous computing platform or type of platform, e.g. by providing native code capabilities of this platform and by comprising a decision rule adapted for this platform or type of platform, while being able to execute a platform-independent intermediate computer code object in highly optimized manner.

The run-time component 23 may also comprise a memory manager unit 25. The intermediate computer code object may be structured such as to allow good portability of data structures between different execution units, e.g. between different CPU and/or GPU architectures. Particularly, the intermediate computer code object format may define data types which can be easily converted to native formats suitable for a wide range of execution units. For example, the memory manager unit may provide memory bookkeeping operations, such as tracking both a CPU pointer and a GPU pointer to a data structure and keeping track of dirty bits for indicating the most recently changed version of a data structure. The memory manager unit may also provide automated copying, mirroring, moving and/or translating of data between execution units, e.g. taking into account low-level differences in architecture and implementation of such execution units.

The run-time component 23 may furthermore comprise a run-time scheduler unit 26. Thus, the run-time component may be adapted for scheduling the concurrent execution of tasks on the plurality of execution units, taking into account data dependencies between the tasks.

Figure 3:
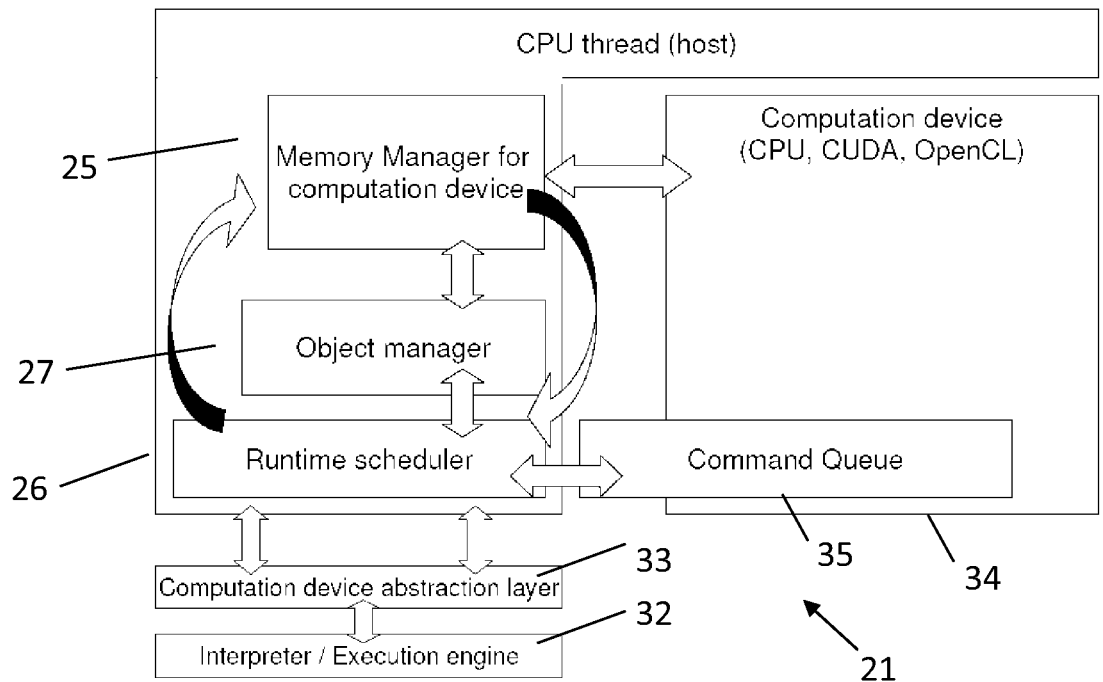
FIG. 3 illustrates an exemplary embodiment of a first computer program product according to the present invention.

FIG. 3 further illustrates an exemplary embodiment of a first computer program product according to embodiments of the present invention, e.g. a run-time system. The computer program product may, when executed on a computer, run in a host process thread 31, e.g. on a CPU of the computing platform. Thus, the first computer program product may be adapted for execution on a host processor, e.g. a CPU, of the computing platform comprising a plurality of execution units.

An interpreter/execution engine 32 may provide functions for retrieving the intermediate computer code object, e.g. may be integrated into or operate in conjunction with the input component 22. A computation device abstraction layer 33 forms an interface between the hardware-agnostic, e.g. platform independent, code of the intermediate computer code object and the computing platform. A runtime scheduler 26 running in the host process thread 31 may retrieve code fragments, e.g. a set of instructions defining a specific task to be performed, from the interpreter/execution engine 32 via the computation device abstraction layer 33.

For example, the interpreter/execution engine 32 may process the intermediate computer code object by evaluating expressions stored therein, e.g. encoded in a reverse Polish notation. For example, when a operand code is encountered, a reference to a corresponding object may be pushed to a stack, e.g. a stack managed by an object manager 27. When an operator is encountered while evaluating the expression, this may be passed to the command queue 35 of an execution unit via the runtime scheduler 26.

The exemplary computer program product may further be adapted to interface with a plurality of computation devices, e.g. a plurality of execution units of the computing platform. For example, the computer program product may be adapted for execution on a host device, e.g. a CPU of the computing platform, and to interface with at least one device-specific computation engine, e.g. a dynamically linked library adapted for controlling at least one computation device. For example, the computer program product 21 may be dynamically linked to a computation engine for executing code on a general purpose CPU device, e.g. the host CPU, and to a computation engine for executing code on a GPU device. Obviously, one computation engine may also control a plurality of different execution units, or may be statically linked to the program product, e.g. may be integrated into the computer program product. However, when the computer program product is adapted for dynamically linking to a plurality of computation engines via a standardized interface, the computer program product may be easily adapted to operate on differently configured computing devices.

The computer program product may be set up to interface with, for example, a CPU computation engine, a CUDA computation engine and an openCL computation engine.

The runtime scheduler 26 furthermore may select for each set of instructions, e.g. each block of code forming a coherent unit or code fragment, defining a task to be performed the most promising target execution unit by applying a decision rule to the metadata associated with the set of instructions. Thus, a command queue 35 for each of the plurality of execution units may be filled with tasks to be executed on each target execution unit, taking into account data dependencies between the sets of instructions of the intermediate code. The runtime scheduler 26 may for example implement a method similar to out-of-order execution in microprocessors to the high-level code corresponding to the intermediate code format.

The runtime scheduler 26 may determine the dimensionality of the parallel operation of a set of instructions before execution of this set of instructions, e.g. the kernel function encoded in this set of instructions. For example, depending on the dimensionality of the data on which the set of instructions will operate, a different number of parallel executions and/or a different number of execution threads may be needed. This runtime determination of parameters that influence the complexity of the task supplements the metadata regarding inherent complexity of the block of code, which may be determined during compilation of the intermediate code object. Based on the multidimensional metadata descriptor, e.g. supplemented by the dimensionality of the parallel operation determined during runtime, the runtime scheduler determines the best execution unit to assign for executing the set of instructions, e.g. the best unit taking a probabilistic prognostic model represented by the decision rule into account. The runtime parameters may also comprise information regarding, for example, the current availability of an input data structure in a memory accessible to a specific execution unit, e.g. to take the cost of memory operations into account when selecting this execution unit.

The decision rule may be predetermined for a specific configuration of the computing platform, and may take for example the maximum number of parallel threads that can be spawned for each execution unit into account. The decision rule may also exclude or include a specific execution unit taking the complexity of the task to be performed into account, e.g. a set of instructions may comprise too much branches or nested loops to be executable on a specific execution unit or the set of instructions needs to operate on a block of data which is too large to fit into a memory accessible to a specific execution unit. The decision rule may also take global runtime parameters into account, for example, a specific execution unit may already have a full command queue.

The command queue 35 for a CPU may for example be implemented using event wait handles and synchronization, as is known in the art. For other execution units, e.g. a GPU, the command queue 35 may require a more complex implementation. For example, OpenCL may be used for interfacing with the GPU, as it already supports command queuing, e.g. once data dependencies for a block of code are resolved, it suffices to pass the dependencies to the OpenCL runtime, and the code block invocation, e.g. a kernel function corresponding to a set of instructions in the intermediate computer code object, can be added to the command queue. However, the command queue 35 for a GPU may also be implemented on the CUDA platform, e.g. by implementing an additional mapping to CUDA streams.

In embodiments according to the present invention, the decision rules may be based on evaluation of parameters as described above. Below two examples of decision rules are described, as can be used in embodiments of the present invention, the invention not being limited thereto.

In the first example it first is checked whether the GPU memory manager has sufficient space to transfer the kernel functions arguments to the GPU memory. It may be possible that the kernel function is referring to a number of very large memory blocks that do not fit into the GPU memory. In the example, to avoid insufficient GPU memory, the choice is to run the kernel function on the CPU. However, other choices are also possible. One alternative is performing a GPU memory compaction (due to compaction, some additional memory could be freed which could enable the kernel function to run on the GPU) Another alternative is using a memory eviction technique (with an eviction policy, e.g. least recently used first). With this technique, memory blocks that reside in the GPU memory are copied back to the CPU memory, so that additional memory becomes available for this kernel function. Still a further alternative is performing a host memory mapping. It is possible to map CPU host memory to the address space of the GPU. The memory access times are then rather high, nevertheless these technique may be useful for kernel functions that use huge matrices (e.g. 1024×1024×1024 in double precision format).

Note that all of these alternatives have their own associated cost. During the evaluation of the decision rule, cost estimates of these techniques can be included to guide the decision. For simplicity, in the example, one just runs the kernel function on the CPU in case there is insufficient GPU memory. Next, one compares the complexity level (parameter 1) of a kernel function to a first threshold and also the product of the dimensions of the kernel function (parameter 4) to a second threshold. When both parameters are smaller than the corresponding thresholds, we are sure that we are dealing with a light-weight kernel function with limited parallelism. In this case, the preferred choice would be to run the kernel function on the CPU. However, there is a memory transfer cost associated to this choice. Note that some input arguments of the kernel function may be stored in the CPU memory, others may be stored in the GPU memory (or both). To calculate the memory transfer cost, one can inspect each variable individually (which requires both run-time and compile-time information):

run-time information: e.g., the dimensions of the matrix, whether it is currently stored in the CPU or GPU memory (dirty flags etc).

compile-time information: the data type of the variable, but also the read/write mode of the variable and/or the update regions. For example, in case a variable representing a matrix is used in write-mode and it is sure that all elements of the matrix are overwritten (this may be checked at compile-time), the original matrix data may be discarded, eliminating the need for data transfers.

Some variables need to be transferred from the GPU to the CPU, other variables need to be transferred from the CPU to the GPU. The function Mem_transfer_bytes calculates the total number of bytes that needs to be copied in one direction, thereby taking the "dirty" flags of the variable into account (e.g. when the variable is stored in both the CPU and the GPU memory and the flag indicates that the variable is non-dirty, there is no need to transfer this block). Using this information, we calculate the difference between the memory transfer times (parameter 8) for copies from GPU to CPU and from CPU to GPU. This is done using some constants Avg_transfer_rate (GPU to CPU) and Avg_transfer_rate (CPU to GPU) that contain (estimates for) the memory transfer times (i.e. respectively read and write times to the GPU). These parameters can be obtained in advance (e.g. by measuring the time it takes to copy N bytes to/from the GPU). In case the difference Delta is smaller than a given threshold T_Delta1, the decision is to run the kernel function on the CPU. Note that the threshold T_Delta1 can be larger than 0 to accommodate for the fact that we know that we are dealing with a light weight kernel function, i.e. we know that the GPU will not bring a lot of performance benefits anyway. In the other case (the data dimensions or the kernel complexity are sufficiently high), the kernel function is a candidate to be executed on the GPU. Then, one calculates the occupancy of the kernel function. The occupancy indicates how many warps will be active compared to the total number of supported warps on the GPU. The occupancy is calculated using a number of GPU parameters (such as the number of registers used by the function, the amount of shared memory, but also the data dimensions and the block dimensions). All of these parameters are available at run-time. In case this number is too low (e.g. due to the large amount of shared memory being used), it can be useful to run the kernel function on the CPU anyway. In this case, one again checks the memory transfer times a threshold, T_Delta2. By way of illustration, the example of how the decision rule is implemented is shown in FIG. 5.

As a second example, the sizes of the command queues of the CPU and GPU can be taken into account. First one compares the complexity level again to threshold, as well as the product of the data dimensions prod(dims) and the code length. The memory transfer time check from the first example is omitted in the present example, but can also be included. After calculation of the occupancy, and in the scenario that we are dealing with a kernel function that is sufficiently computationally intensive, one checks the sizes of the CPU and the GPU command queues. In this example, one takes the total number of kernel functions that are scheduled to the CPU and the GPU command queues, however, this may also be an estimate of the load of the CPU and GPU command queues (e.g. calculated through the data dimensions and complexity levels of the kernel functions that are already scheduled). One compares the differences of the sizes of the command queues to a threshold T_size. Finally, the memory transfer times are checked, in order to make a final decision. An implementation of how such a decision rule can be implemented is shown in FIG. 6.

The runtime scheduler 26 may furthermore interface with a memory manager 25 for automated memory allocation in order to provide data for being processed by the execution of each of said at least one set of instructions to the corresponding target execution unit. For example, the program product 31 may be configured to operate on a computing platform consisting of a computer comprising two GPUs with different memory location or a plurality of CPU cores and one or more GPUs. This configuration may for example be effected by setting the program product up to link with a CPU computation engine and a CUDA computation engine. The memory manager 25 may provide memory allocation operations in the shared RANI memory accessible to the CPU and the graphics RAM accessible to the GPU. The memory manager 25 may further transfer data structures between both memories when the runtime scheduler detects a data dependency of a first set of instructions targeted for execution on, for example, the CPU, and a second set of instructions targeted for execution on, for example, the GPU. The memory manager may also be adapted for keeping track of multiple copies, e.g. in different memories, and synchronizing copies to the most recently updated version when the need arises. The memory manager may also be adapted for garbage collection and/or for freeing up memory for a specific execution unit by moving data which is not currently in use by the specific execution unit to a memory associated with a different execution unit.

The memory manager may provide automated memory allocation, such that, for example translations between hardware-specific data representations suitable for different execution units are carried out automatically, and without requiring specific instructions in the intermediate computer code object to perform such operations.

Embodiments of the present invention have the advantage that the user, e.g. the programmer, does not have to manually copy data between memories allocated to a first execution unit, e.g. the CPU, and a second execution unit, such as a GPU. It is known in the art that explicitly programming such operations can be tedious, e.g. for object graphs with pointers. For example, without such automated memory management, data objects, which may be fragmented in memory, could require several memory block copies having an associated time cost and/or complex constructs of reference pointers need to be traversed in the source memory and mirrored in the target memory. Furthermore, hardware or low-level software constraints may require a substantially different data organisation for the target device than which was in use for the source device.

Embodiments of the present invention also have the advantage that the user, e.g. the programmer, does not need to specify which blocks of code, e.g. kernel functions, can be executed in parallel and which needs to be executed serially. Thus, an efficient use of time can be achieved during programming. Furthermore, in the development process, data dependencies may change, thus would require a re-evaluation of concurrency properties, and could possibly lead to dependency bugs, in a conventional system. This disadvantage is therefore also overcome by embodiments of the present invention.

Since embodiments of the present invention may provide automatic memory management, a good use of memory resources may be obtained. For example, manual memory management may be difficult and could lead to simple yet wasteful memory pre-allocation practices. Furthermore, manual memory management can easily lead to memory leaks that are difficult to detect and correct.

When a set of instructions, e.g. a kernel function, is launched, the runtime scheduler 26 may create an object representative of a command and inspect the data structures associated with this command, e.g. operands passed to the kernel function. The data objects corresponding to these data structures in a memory accessible to the target execution unit selected for the execution of this set of instructions may then be pinned to prevent this data object from moving or de-allocating during execution. This pinning may comprise adding a flag to a memory block in a memory structure allocated for use by the memory manager 25, the flag indicating that the referenced memory block may not be moved or de-allocated. Such memory pinning arrangements are well-known in the art, e.g. used in many operating systems for virtual memory management. For example, CUDA also supports a similar arrangement in which CPU memory is pinned to provide CPU host memory access to a GPU via direct memory access (DMA).

However, the runtime scheduler may provide object-level pinning, as opposed to the memory management level, because a single object may have multiple copies in separate memory spaces, e.g. corresponding to different execution units. Thus an object may be pinned or unpinned, e.g. flagged or unflagged, for one or more devices. For example, for a configuration comprising a single CPU having a dedicated system memory and a single GPU having a dedicated device memory, an object can be pinned: in device memory when in use by the GPU, in system memory when in use by the CPU, in both memories when used in parallel by CPU and GPU (e.g. when only read operations are performed), or can be unpinned in both memories when not in use. In the latter case, the memory manager may move a copy of the object within one of the memories, e.g. for compacting memory blocks, or may move the object between the memories, e.g. to make it available to the GPU when the copy in CPU memory was more recently updated.

A flag used for pinning may also comprise a read/write indicator. For example, when a write indicator is set for the device memory, a memory copy to the system memory should be carried out when the CPU needs to operate on the data object. While, when a read only inductor is set, this operation is not necessary.

Furthermore, the pinning system may be implemented in a hierarchical manner, such that for an object graph, pinning of all individual nodes of the graph is avoided by using parent node pinning.

When a set of instructions is launched, the runtime scheduler 26 may create an object representative of a command, and the object pins of the data objects associated to the set of instructions, e.g. the operands passed to the function call, may be linked to the command object such that the scheduler may track the data dependencies. Furthermore, each object may have an associated list of commands in which the data participates. Thus, when a set of instructions is launched, e.g. a kernel function, the dependencies between the commands in the command queue 35 can be easily determined, by inspecting the list of commands associated with the object pins. Furthermore, by inspecting the read/write accesses of the objects, the scheduler may determine whether a concurrent or serial execution of the command is appropriate. For example, subsequent read accesses to an object can be aggregated, since they do not introduce a new data dependency. Furthermore, read after write (RaW), write after read (WaR) and write after write (WaW) operations on an object need to be serialized, such that a new data dependency is introduced.

In a third aspect, the present invention also relates to a second computer program product, e.g. a functionally interrelated product to the first computer program. This second computer program product may for example be a software compiler. The second computer program product, e.g. the compiler, and the first computer program product, e.g. a runtime execution interpreter, according to embodiments form a pair of interrelated products, e.g. complement each other and work together. Particularly, the second computer program product according to embodiments may be used to, e.g. may be adapted for, generate an intermediate computer code object comprising at least one set of instructions, e.g. at least one sequence of instructions, each such sequence forming a coherent code block such as a function or routine, and accompanying metadata corresponding to this at least one set of instructions, while the first computer program product according to embodiments may be used to, e.g. may be adapted for, execute this intermediate computer code object on a computing platform. Thus each computer program product is linked via the intermediate computer code object which allows efficient platform-independent compilation while still enjoying platform-dependent optimized execution on a computing platform comprising a plurality of execution units which may have mutually substantially distinct architectures and therefore mutually distinct capabilities and relative performance strengths and weaknesses with respect to each other.

Figure 4:
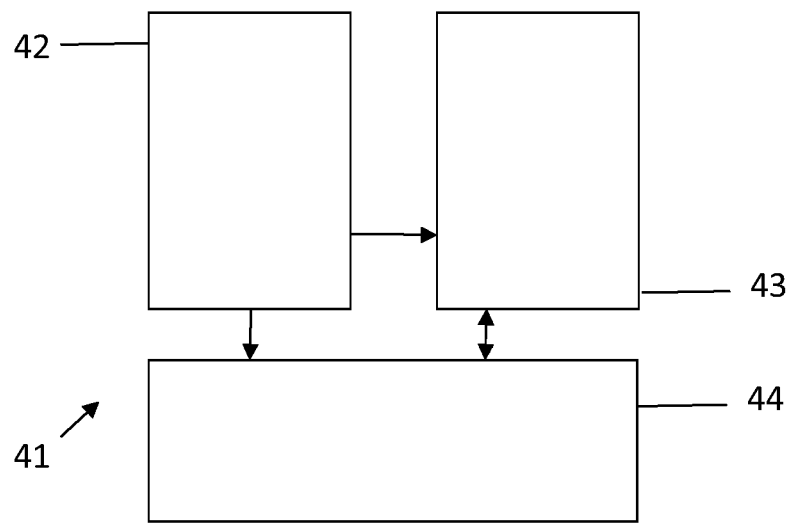
FIG. 4 illustrates a second computer program product according to embodiments of the present invention.

FIG. 4 illustrates an exemplary second computer program product 41 according to embodiments of the present invention. The second computer program product 41 for generating an intermediate computer code object comprises an input component 42 for obtaining a computer program code specified in accordance to a high-level programming language specification. This high-level programming language may for example comprise C++, pascal, BASIC, smalltalk, or even a very high-level programming language (VHLL). Such high-level programming language may be extended in order to take advantage of all features of the second computer program product, e.g. by #pragma directives or additional keywords not defined in the language standard. However, the high-level programming language may also be specifically designed to take full advantage of the features of the present invention, e.g. to provide native variable classes which provide a high portability and/or specific control structures for parallel and/or distributed systems such as parallel-for loops.

The second computer program product 41 further comprises a compiler component 43 for compiling the computer program code into an intermediate computer code object comprising at least one set of instructions corresponding to a task to be performed. This intermediate computer code object may for example be a byte-level code for an abstract machine. For example, the source code of a program is translated into a form more suitable for code-improving transformations before being used, e.g. by a first computer program product according to embodiments of the present invention, to generate machine code for a target processor during runtime. The intermediate language to which the intermediate computer code object confirms may for example have one fundamental operation corresponding to each instruction, where a fundamental operation may relate to a, possibly computationally involved, operation, such as a matrix multiplication. Such intermediate computer code may furthermore be defined without directly specifying typical low-level operations such as register manipulation or instruction pointer manipulation.

The second computer program product 41 further comprises an analysis component 44 for annotating each of the at least one set of instructions with a plurality of metadata descriptors representative of a corresponding plurality of complexity measures characterizing the at least one set of instructions, e.g. representative of the complexity of the task to be performed. For example, the analysis component 44 may be adapted for determining the plurality of metadata descriptors representative of at least a measure related to conditional branches, backward jumps, dynamic memory allocation, indirect function calls and/or thread synchronization. It is to be noted that this complexity metadata may be highly machine-independent, e.g. may characterize aspects related to complexity of a task to be executed without taking machine-specific performance characteristics into account. Such complexity metadata may for example relate to:

- the number of instructions required to perform the task,
- the presence, number and/or nesting depth of execution loops required,
- the presence, number and/or nesting depth of conditional branches required,
- the presence, number or depth of recursive statements,
- the use of dynamic memory allocation,
- the static and/or dynamic memory storage space requirements, and/or
- the use of indirect function references, object inheritance, dynamic object dispatching, abstract data types, object encapsulation and/or open recursion.

The above described method embodiments for executing an intermediate computer code object may be implemented as software in a processor. One configuration of such a processor may for example include at least one programmable computing component coupled to a memory subsystem that includes at least one form of memory, e.g., RAM, ROM, and so forth. It is to be noted that the computing component or computing components may be a general purpose, or a special purpose computing component, and may be for inclusion in a device, e.g., a chip that has other components that perform other functions. Thus, one or more aspects of the present invention can be implemented in digital electronic circuitry, or in computer hardware, firmware, software, or in combinations of them. For example, each of the method steps of the method for executing an intermediate computer code object may be a computer implemented step implemented as one or a set of instructions. Thus, while a processor as such is prior art, a system that includes the instructions to implement aspects of the methods for executing the intermediate computer code object is not prior art.

The present invention thus also includes a computer program product which provides the functionality of any of the methods according to the present invention when executed on a computing device.

Vice versa, the computer program products described above may be implemented as hardware in computing devices. Alternatively, the computer program products may be implemented as computer-implemented methods and the present invention therefore also relates to the corresponding computer-implemented methods.

In another aspect, the present invention relates to a data carrier for carrying a computer program product as described above. Such a data carrier may comprise a computer program product tangibly embodied thereon and may carry machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non-volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

The invention claimed is:

1. A computer-implemented method comprising:
   obtaining an intermediate computer code object comprising at least one set of instructions corresponding to a task to be performed, the intermediate computer code object further comprising for each of said at least one set of instructions one or more of metadata descriptors representative of at least a complexity measure of said task to be performed, said intermediate computer code object being machine-independent, and said complexity measure being at least based on an analysis of the intermediate computer code, and
   executing at run-time said intermediate computer code object on a computing platform comprising at least two different execution units having a memory with a different memory location, said executing at run-time comprising selecting for each of said at least one set of instructions a target execution unit from said plurality of execution units and executing said intermediate computer code object on said selected execution unit, said selecting taking into account the one or more of metadata descriptors and a decision rule relating said at least a complexity measure to a performance characteristic of the plurality of execution units, said executing the intermediate computer code object comprising translating each of the at least one set of instructions to a machine level format executable by the corresponding target execution unit, wherein said at least one complexity measure is included in a plurality of complexity measures comprising mutually independent measures, relating to different aspects of computational complexity of said at least one set of instructions, wherein the decision rule is adapted for predicting which of the plurality of execution units will perform best at performing the task encoded by said at least one set of instructions and wherein the decision rule is partitioning a joint space spanned by the plurality of complexity measures and the at least one runtime parameter into regions of dominant performance for subsets of the plurality of execution units, wherein the at least one runtime parameter indicates dimensions along which said at least one set of instructions operates.

2. The computer-implemented method according to claim 1, wherein the at least two different execution units are a central processing unit (CPU) and a graphical processing unit (GPU).

3. The computer-implemented method according to claim 1, wherein the at least two different execution units are graphical processing units (GPUs) having a memory with a different memory location.

4. The computer-implemented method according to claim 1, wherein said at least a complexity measure is obtained by at least analyzing the intermediate computer code object.

5. The computer-implemented method according to claim 1, wherein said one or more metadata descriptors are representative of said at least a complexity measure of said task to be performed.

6. The computer-implemented method according to claim 1, wherein said intermediate computer code object is obtained in an execution unit independent intermediate format.

7. The computer-implemented method according to claim 1, in which executing the intermediate computer code object comprises determining whether a first set of said at least one set of instructions and a second set of said at least one set of instructions can be executed concurrently.

8. The computer-implemented method according to claim 1, in which executing the intermediate computer code object comprises providing automated memory allocation to provide data for being processed by the execution of each of said at least one set of instructions to the corresponding target execution unit.

9. The computer-implemented method according to claim 1, in which obtaining the intermediate computer code object comprises compiling the intermediate computer code object from a computer program code specified in accordance to a high-level programming language specification and/or in which obtaining the intermediate computer code object further comprises for each of said at least one set of instructions determining the one or more of metadata descriptors representative of said at least a complexity measure.

10. The computer-implemented method according to claim 1, wherein the one or more metadata descriptors are one or more parameters determinable at compiler level and expressing a complexity of a kernel function of the intermediate computer code object.

11. The computer-implemented method according to claim 1, wherein said selecting also takes into account one or more of a code length, a product of data dimensions, a product of GPU block dimensions, a total number of GPU blocks, a number of assigned CPU threads, a memory transfer time, a GPU occupancy, a size or load of CPU and GPU command queues or an overall load of CPU and GPU queues.

12. A non-transitory data carrier comprising a set of instructions for, when executed on a computer, executing intermediate computer code object on a computing platform comprising at least two different execution units having a memory with different memory location according to a method according to claim 1.

13. A computer-implemented method according to claim 1, wherein the metadata descriptors comprise structured variables.

14. A first computer program product for executing an intermediate computer code object, the first computer program product comprising:
an input component configured for obtaining an intermediate computer code object comprising at least one set of instructions corresponding to a task to be performed, the intermediate computer code object further comprising for each of said at least one set of instructions one or more of metadata descriptors representative of a corresponding plurality of complexity measures of said task to be performed, said intermediate computer code object being machine-independent, and said complexity measure being at least based on an analysis of the intermediate computer code, and
a run-time component configured for executing said intermediate computer code object on a computing platform comprising at least two different execution units having a memory with a different memory location,
wherein the run-time component comprises a selection unit for selecting for each of said at least one set of instructions a target execution unit from said at least two execution units, said selecting taking into account the one or more of metadata descriptors and a decision rule relating said plurality of complexity measures to a performance characteristic of the at least two different execution units, and said run-time component is programmed for translating each of the at least one set of instructions to a machine level format executable by the corresponding target execution unit and for executing said intermediate computer code object on said selected execution unit, wherein said at least one complexity measure is included in a plurality of complexity measures comprising at least mutually independent measures, relating to different aspects of computational complexity of said at least one set of instructions, wherein the decision rule is adapted for predicting which of the plurality of execution units will perform best at performing the task encoded by said at least one set of instructions and wherein the decision rule is partitioning a joint space spanned by the plurality of complexity measures and the at least one runtime parameter into regions of dominant performance for subsets of the plurality of execution units, wherein the at least one runtime parameter indicates dimensions along which said at least one set of instruction operates.

15. The first computer program product according to claim 14, wherein the run-time component furthermore comprises a memory manager unit programmed for automated memory allocation and/or a run-time scheduler unit programmed for determining whether a first set of said at least one set of instructions and a second set of said at least one set of instructions can be executed concurrently.

16. A system comprising a first computer program product for executing an intermediate computer code object, and a second computer program product for generating the intermediate computer code object, the second computer program product comprising:
an input component configured for obtaining a computer program code specified in accordance to a high-level programming language specification,
a compiler component configured for compiling the computer program code into the intermediate computer code object comprising at least one set of instructions corresponding to a task to be performed, the compiler component being instantiated in CPU or GPU, and
an analysis component configured for annotating each of said at least one set of instructions with one or more of metadata descriptors representative of at least one complexity measure of said task to be performed, the analysis component being instantiated in CPU or GPU,
wherein when the generated intermediate computer code object is executed by the computer program product on a computing platform comprising at least two different execution units, a target execution unit from said at least two execution units is selected taking into account said one or more metadata descriptors,
wherein the first computer program product for executing the generated intermediate computer code object comprises:
an input component configured for obtaining an intermediate computer code object comprising at least one set of instructions corresponding to a task to be performed, the intermediate computer code object further comprising for each of said at least one set of instructions one or more of metadata descriptors representative of a corresponding plurality of complexity measures of said task to be performed, said intermediate computer code object being machine-independent, and said complexity measure being at least based on an analysis of the intermediate computer code, said complexity measure being in function of at least one runtime parameter, and a run-time component configured for executing said intermediate computer code object on a computing platform comprising at least two different execution units having a memory with a different memory location, wherein the run-time component comprises a selection unit for selecting for each of said at least one set of instructions a target execution unit from said at least two execution units, said selecting taking into account the one or more of metadata descriptors and a decision rule relating said plurality of complexity measures to a performance characteristic of the at least two different execution units, and said run-time component is programmed for translating each of the at least one set of instructions to a machine level format executable by the corresponding target execution unit and for executing said intermediate computer code object on said selected execution unit, wherein said at least one complexity measure is included in a plurality of complexity measures comprising at least mutually independent measures, relating to different aspects of computational complexity of said at least one set of instructions, wherein the decision rule is adapted for predicting which of the plurality of execution units will perform best at performing the task encoded by said at least one set of instructions and wherein the decision rule is partitioning a joint space spanned by the plurality of complexity measures and the at least one runtime parameter into regions of dominant performance for subsets of the plurality of execution units, wherein the at least one runtime parameter indicates dimensions along which said at least one set of instruction operates.

17. The system according to claim 16, in which the analysis component is adapted for determining the one or more metadata descriptors representative of at least a measure related to conditional branches, backward jumps, dynamic memory allocation, indirect function calls and/or thread synchronization.

* * * * *